(12) United States Patent
Potter et al.

(10) Patent No.: US 6,847,645 B1
(45) Date of Patent: Jan. 25, 2005

(54) METHOD AND APPARATUS FOR CONTROLLING PACKET HEADER BUFFER WRAP AROUND IN A FORWARDING ENGINE OF AN INTERMEDIATE NETWORK NODE

(75) Inventors: Kenneth H. Potter, Raleigh, NC (US); Barry S. Burns, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 879 days.

(21) Appl. No.: 09/791,074

(22) Filed: Feb. 22, 2001

(51) Int. Cl.[7] .............................................. H04L 12/28
(52) U.S. Cl. ........................ 370/392; 370/389; 709/238
(58) Field of Search ................................ 709/238, 246, 709/201, 202; 370/351, 356, 386, 389, 392, 396, 395.7, 395.71, 412, 413, 415, 417

(56) References Cited

U.S. PATENT DOCUMENTS

| | | | | |
|---|---|---|---|---|
| 6,101,599 A | * | 8/2000 | Wright et al. ................ | 712/228 |
| 6,424,659 B2 | * | 7/2002 | Viswanadham et al. .... | 370/469 |
| 2001/0049744 A1 | * | 12/2001 | Hussey et al. .............. | 709/238 |

OTHER PUBLICATIONS

U.S. Appl. No. 09/791,063, M. Rachepalli et al.
U.S. Appl. No. 09/791,968, W. Brandt et al.
Cisco 7200 and NPE Hardware Overview, Cisco Systems, Inc. 1999; pp. 1–35.

* cited by examiner

Primary Examiner—Phirin Sam
(74) Attorney, Agent, or Firm—Cesari and McKenna, LLP; A. Sydney Johnston

(57) ABSTRACT

A method and apparatus manages packet header buffers of a forwarding engine contained within an intermediate node, such as an aggregation router, of a computer network. Processors of the forwarding engine add and remove headers from packets using a packet header buffer, i.e., context memory, associated with each processor. Addition and removal of the headers occurs while preserving a portion of the "on-chip" context memory for passing state information to and between processors of a pipeline, and also for passing move commands to direct memory access (DMA) logic external to the forwarding engine. A wrap control function capability within the move command works in conjunction with the ability of the DMA logic to detect the end of the context and wrap to a specified offset within the context. That is, rather than wrapping to the beginning of a context, the wrap control capability specifies a predetermined offset within the context at which the wrap point occurs.

23 Claims, 9 Drawing Sheets

METHOD AND APPARATUS FOR CONTROLLING PACKET HEADER BUFFER WRAP AROUND IN A FORWARDING ENGINE OF AN INTERMEDIATE NETWORK NODE

CROSS-REFERENCE TO RELATED APPLICATIONS

The present invention is related to the following co-pending and commonly assigned U.S. patent applications:

U.S. patent application Ser. No. 09/791,063 titled, High Performance Interface Logic Architecture of an Intermediate Network; and U.S. patent application Ser. No. 09/790,968 titled, Mapping Technique for Computing Addresses in a Memory of an Intermediate Network Node, each of which was filed on even date herewith and incorporated by reference as though fully set forth herein.

FIELD OF THE INVENTION

The present invention relates to intermediate nodes of a communications network and, in particular, to management of a memory resource of an intermediate node, such as an aggregation router, used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to pre-defined protocols. In this context, a protocol consists of a set of rules defining how the nodes interact with each other.

Computer networks may be further interconnected by an intermediate network node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer, i.e., layer 3, of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (PoP). An ISP network usually consists of a number of PoPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. More notably, the aggregation router is configured to accommodate increased density by aggregating a large number of leased lines from ISP subscribers onto a few trunk lines coupled to an Internet backbone.

In a typical implementation of a router, a processor is provided to process an original header of a packet while leaving the remainder of the packet, i.e., the "trailer", unchanged. In a high-end router implementation using a network processor, dedicated hardware is provided to efficiently pass the original packet header to a forwarding engine. The forwarding engine may be implemented as a "chip", e.g., an application specific integrated circuit (ASIC), comprising a plurality of processors and memories. Each memory, i.e., a header buffer, is configured to temporarily store (hold) the packet header as it is processed (modified) by a processor. This eliminates time that would otherwise be wasted waiting to fetch portions of the header from an external device or storage. Only the original packet header is brought "on-chip" to reduce the memory and bandwidth requirements for the forwarding engine; the packet trailer is held in an external, lower-cost memory of the dedicated hardware. The trailer is thereafter rejoined (merged) with a modified packet header computed by the processors.

The modifications made to the original packet header typically include removal of a layer 2 header associated with an ingress port of the router, modification of specific fields of the header and the addition of a new, modified layer 2 header associated with an egress port of the router. Often the packet may be carried within a "tunnel" (e.g., GRE, IP/IP or IPSEC) that contributes to the number and length of headers that must be removed and/or added by the processors. Therefore, the sizes of the original and modified headers may be different. However, the actual length of the original packet header is generally not known until processing begins. As a result, a worst case header length is always passed to the forwarding engine and the size of each header buffer must be sufficient to handle this "longest" original packet header. The on-chip header buffer must also be large enough to hold a largest resulting header length.

Other information that is typically passed to the forwarding engine along with the packet header may include interface and queue state information. A portion of the on-chip header buffer is also used to store output commands that instruct external direct memory access (DMA) logic where to move the header from the on-chip buffer when merging it with the packet trailer in a bulk external memory or when de-queuing packets. For an implementation wherein the processors operate in a serial "pipeline" configuration, each processor typically performs a part of the total packet processing. In such an implementation, additional state information may be passed within the on-chip buffer "space" from one processor to the next.

Often, a substantial portion of the original packet header is unchanged or unmodified. Copying of this portion of the original header from one location to another within the header buffer is expensive in terms of processor cycles and on-chip buffer space. Therefore, it is desirable to manage the on-chip header buffer to avoid these copies and to minimize the header buffer size. This is particularly desirable when the forwarding engine ASIC contains many processors, each having one or more on-chip buffers configured to hold packet headers that are passed from processor to processor.

SUMMARY OF THE INVENTION

The present invention comprises a method and apparatus for managing a packet header buffer of a forwarding engine contained within an intermediate node, such as an aggregation router, of a computer network. The forwarding engine is preferably embodied as at least one "chip", e.g., an application specific integrated circuit, having a plurality of processors arrayed as pipelines. The processors add and remove headers from an original packet header of a packet using the packet header buffer, i.e., context memory, associated with each processor. Addition and removal of the headers occurs while preserving a portion of the "on-chip" context memory for passing state information to and between processors of a pipeline, and also for passing commands, such as move commands, to direct memory access (DMA) logic (i.e., engines) external to the forwarding engine.

Broadly stated, for each complete packet received at the router, an original header of the packet is copied (stored) in a context as the remainder of the packet, i.e., the trailer, is held in an off-chip memory. The context is then passed to the forwarding engine and stored in the context memory as the forwarding engine processes (modifies) the context to generate a processed context having an extended packet header. The extended packet header may be longer than the original packet header. As a result, an unmodified portion of original packet header is overwritten with a modified portion of the extended packet header to ensure that the processed context can be stored in the context memory. The forwarding engine then returns the extended packet header in the processed context. The processed context also includes at least one move command that instructs the DMA logic to move the header, along with the packet trailer in the off-chip memory, into an external bulk memory where they may be merged.

According to the invention, the novel method and apparatus comprises a wrap control function capability within the move command that is generated by the forwarding engine and that is included within the processed context. The wrap control function works in conjunction with the DMA engines to detect the end of the processed context and to wrap to a predetermined offset within the processed context where the modified portion of the extended packet header resides. That is, the overwritten portion of the extended packet header resides at the predetermined offset defined by the wrap control function. The DMA engines utilize the wrap control function when retrieving the extended packet header from the processed context.

Advantageously, the invention provides a means to limit the amount of costly on-chip context memory to the size of a worst-case packet header length, even when a small header needs to be extended to a long header. This is particularly important in multiprocessor designs, where the context memory is replicated many times. The invention also limits manipulation of addresses by the processors, thereby preserving processor cycles for actual packet processing. Moreover, the present invention limits the number of move commands that must be issued to the DMA engines by keeping the packet header logically contiguous in the context memory.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
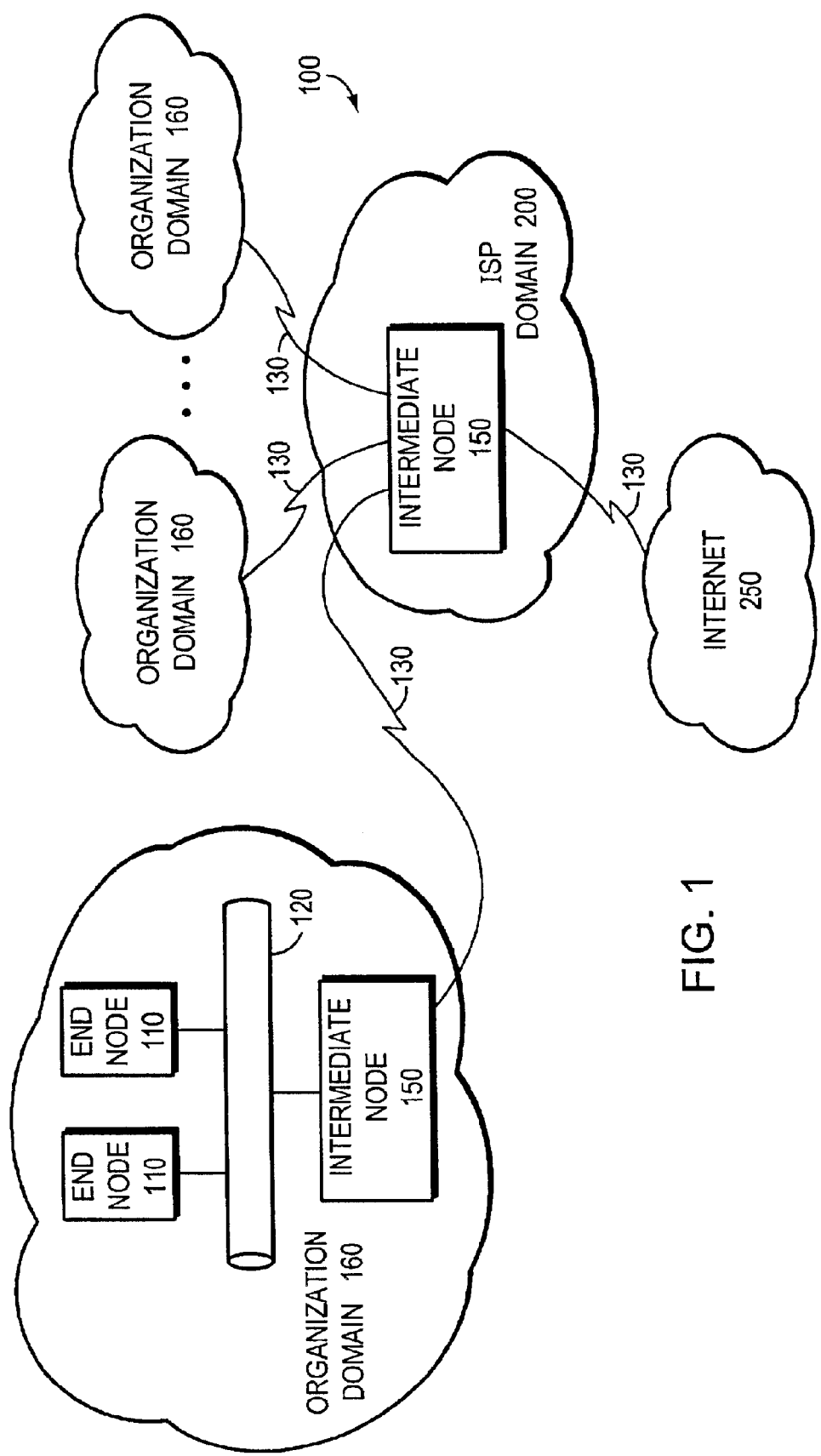
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
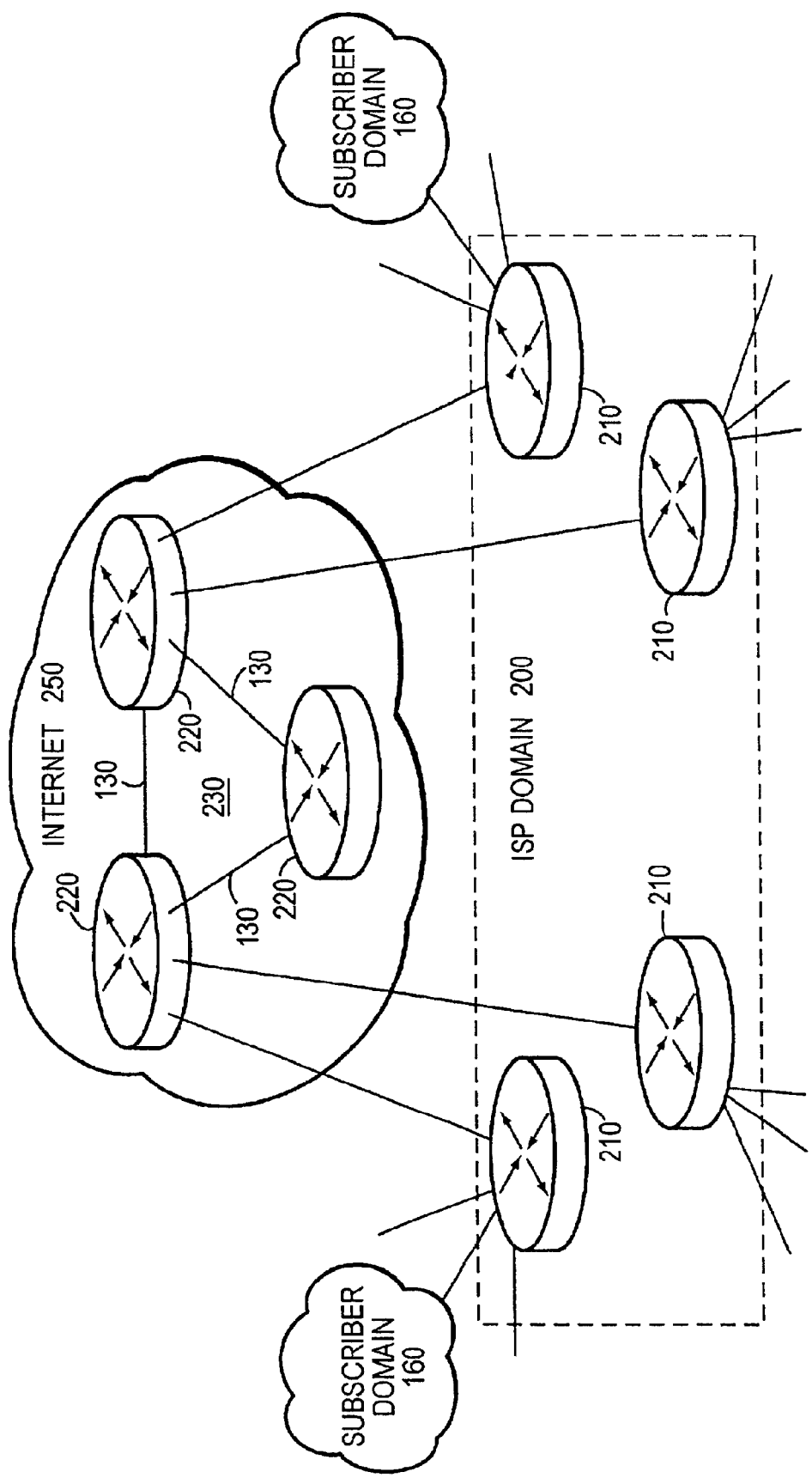
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
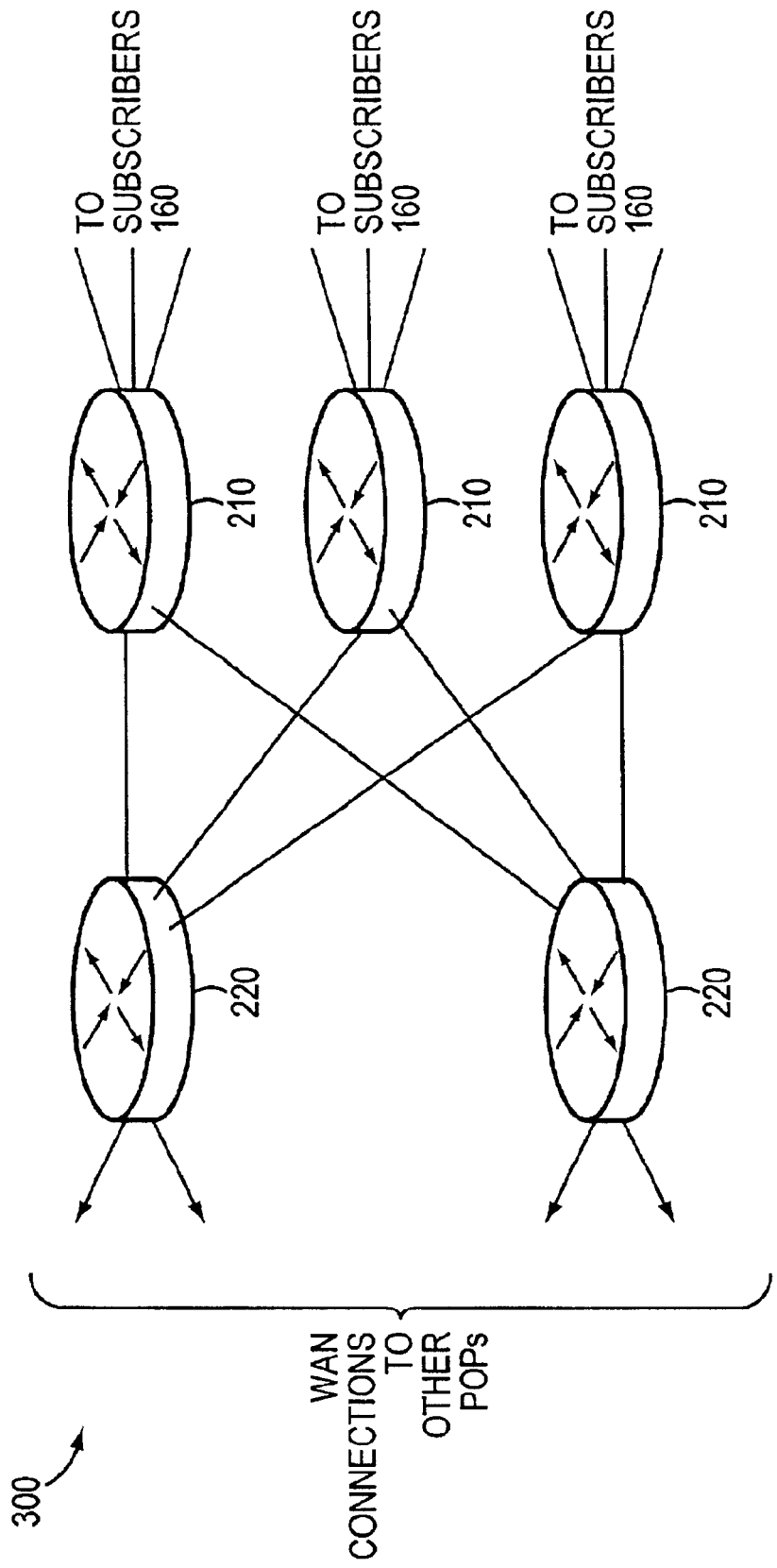
FIG. 3 is a schematic block diagram of an illustrative embodiment of an ISP point of presence (PoP) that may be advantageously used with the present invention.

An ISP domain 200 may be further organized into points of presence (PoP), each of which comprises a physical location wherein a set of access and backbone routers is located. FIG. 3 is a schematic block diagram of an illustrative embodiment of a PoP 300 that may be advantageously used with the present invention. The PoP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
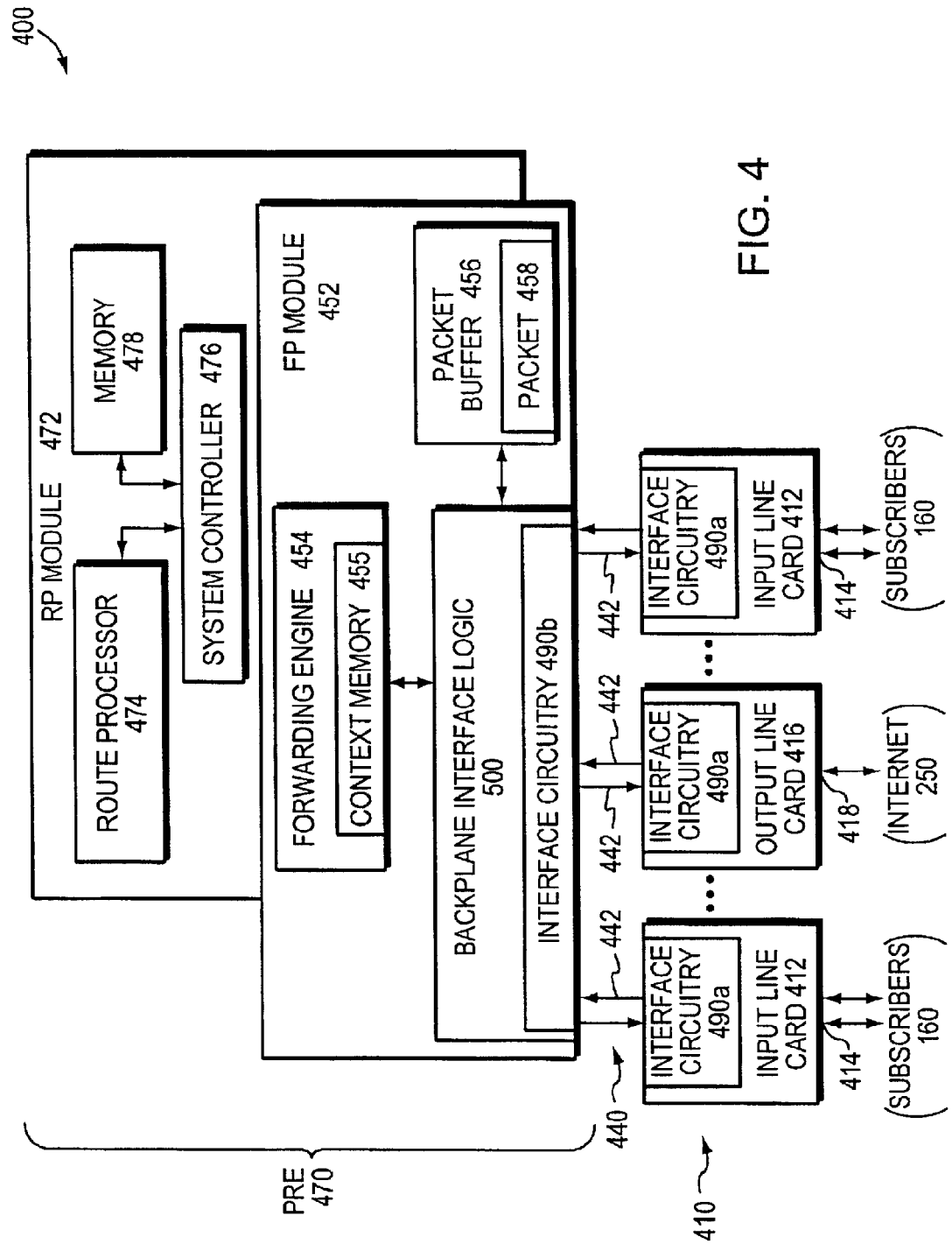
FIG. 4 is a schematic block diagram of an aggregation router that may be advantageously used with the present invention.

FIG. 4 is a schematic block diagram of an aggregation router 400 that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a route processor (RP) module 472 adapted to perform packet forwarding and routing operations, respectively. The FP and RP modules are preferably interconnected in a "mezzanine" arrangement to form the PRE 470. The PRE assembly also provides quality of service (QoS) functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. A network routing operating system, portions of which are typically resident in memory 478 and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms.

The FP module 452 is responsible for rendering forwarding decisions for the aggregation router and, to that end, includes a forwarding engine 454 (such as an arrayed processing engine) coupled to a high-performance backplane interface logic circuit 500. The forwarding engine 454 is preferably embodied as two high performance "chips", e.g., application specific integrated circuits (ASICs) having a plurality of processors arrayed as four (4) rows and eight (8) columns in a 4×8 arrayed configuration, wherein each column is coupled to a column memory. However, it will be understood to those skilled in the art that other arrayed configurations, such as an 8×2 or 8×8 array, may be used in accordance with the present invention. The column memory preferably comprises synchronous dynamic random access memory (SDRAM) storage locations addressable by the forwarding engine 454 for storing software code and data structures accessed by the processors. The software code is preferably a binary, assembly language image or micro-code adapted for execution by processors of the engine 454. It will be apparent to those skilled in the art that other memory means, including various computer readable media, may be used for storing and executing program instructions pertaining to the operation of the forwarding engine.

The aggregation router 400 illustratively includes sixteen (16) line cards 410, each of which may be configured for an OC-12 (622 Mbps) data rate. Thus, the point-to-point links 442 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. (112025-0439) titled High Performance Protocol for an Interconnect System of an Intermediate Network Node, which application is hereby incorporated by reference as though fully set forth herein.

Interface circuitry 490 coupled to the ends of the unidirectional links 442 is resident on both the line cards 410 and the backplane logic circuit 500. The backplane logic circuit is also preferably embodied as a high performance ASIC, hereinafter referred to as the Cobalt ASIC, which is configured to further interface the line cards to a packet buffer 456 of the FP module. The packet buffer 456 preferably comprises SDRAM devices used to store packets 458 as the forwarding engine 454 determines where and when they should be forwarded within the aggregation router. For example, the packet buffer may be used to store low priority data packets while high priority, low latency voice packets are prioritized by the forwarding engine to an output card (e.g., the trunk card 416) of the aggregation router. An example of a backplane logic circuit that may be advantageously used with the present invention is disclosed in co-pending and commonly-owned U.S. patent application Ser. No. (112025-0438) titled High Performance Interface Logic Architecture of an Intermediate Network Node, which application is hereby incorporated by reference as though fully set forth herein.

The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a protocol format for transmission from, e.g., the Barium ASIC over the interconnect system 440 to the Cobalt ASIC. The ASICs also include circuitry to perform cyclic redundancy code generation and checking on packets, along with interconnect format checking.

Figure 5:
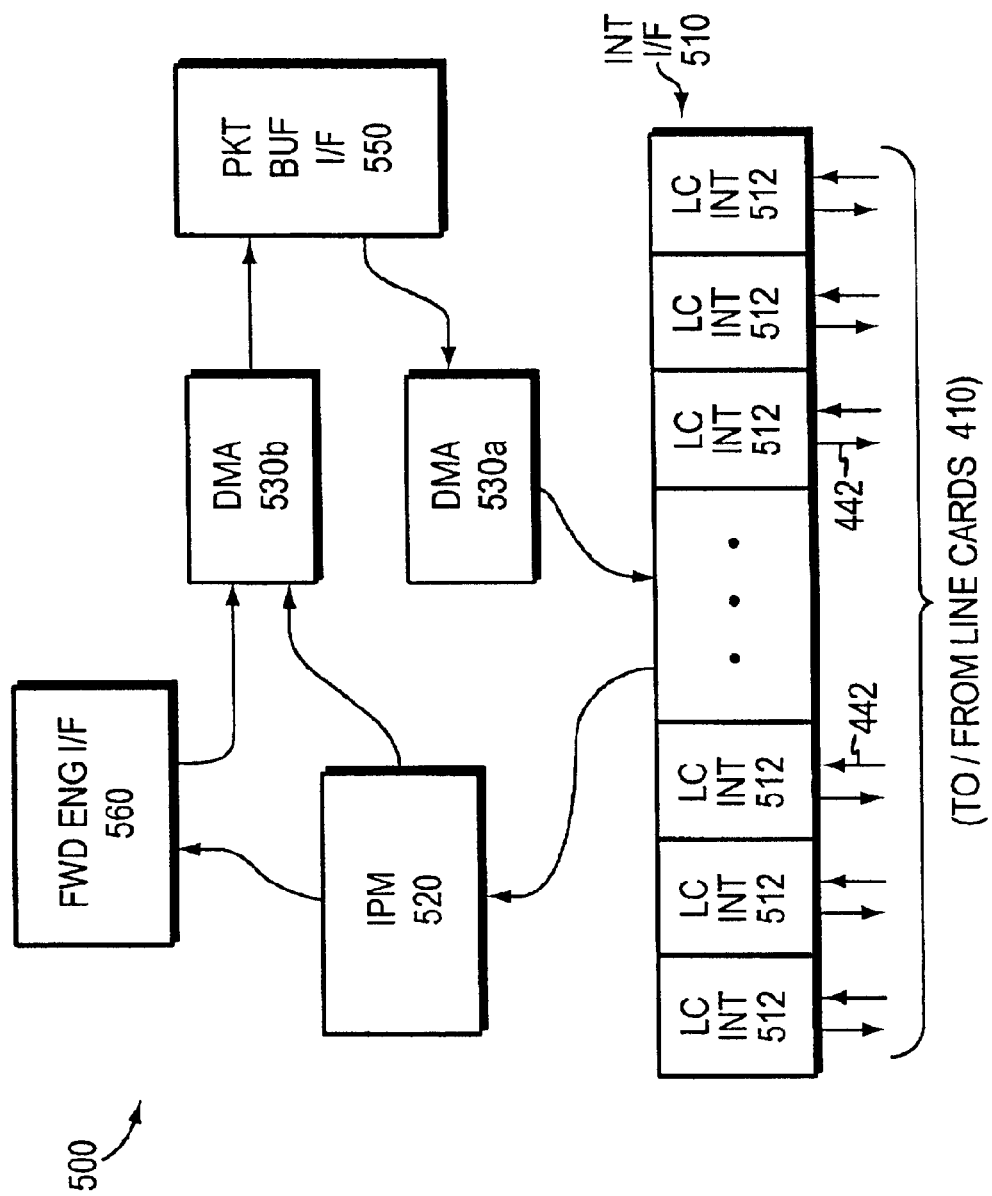
FIG. 5 is a functional block diagram of interface logic circuitry contained on an application specific integrated circuit of the aggregation router.

FIG. 5 is a functional block diagram of the backplane interface logic 500 contained on the Cobalt ASIC in accordance with the present invention. The interface logic circuitry comprises a plurality of high-bandwidth functional circuits including an interconnect interface (Int I/F) section 510 comprising a plurality of (e.g., 16) line card interface circuits (LC Int 512). Each LC Int 512 comprises small, low risk and low power transceiver circuitry coupled a line card 410 over a point-to-point link 442 of the interconnect system 440. The Cobalt ASIC 500 also includes a packet buffer interface (Pkt Buf I/F) section 550 comprising read/write circuitry configured to interface with the packet buffer 456, and a forwarding engine interface (Fwd Eng I/F) section 560 comprising read/write circuitry for interfacing with the forwarding engine 454.

The backplane interface logic 500 also includes an off-chip memory, e.g., an internal packet memory (IPM 520) for temporarily storing the packets, including their payloads (i.e., "trailers"), while the forwarding engine 454 processes the headers of the packets. A plurality of direct memory access (DMA) logic controllers (i.e., engines) 530 control the movement of data to and from the line cards 410, packet buffer 456 and forwarding engine 454. As described herein, the forwarding engine 454 generates commands to the DMA engines 530 to enable merging of processed headers with their trailers and transferring of data to and from the packet buffer 456. Here, at least one first DMA engine 530a facilitates data transfers from the Pkt Buf I/F 550 to the LC Int 512. At least one second DMA engine 530b facilitates merging of an updated (new) header from the Fwd Eng I/F 560 with its corresponding trailer retrieved from the IPM 520 for delivery to the Pkt Buf I/F 550.

Operationally, a packet 458 is initially received at an input port 414 of a line card 412 and, after minimal buffering, is sent over a point-to-point link 442 to the Cobalt ASIC 500 where it is temporarily stored in the IPM 520. During normal packet processing, the Cobalt ASIC sends an original header of the packet to the forwarding engine for processing and holds the entire packet, including its trailer, in the IPM until receiving further instructions/commands from the forwarding engine. As a result, the entire packet must be received and stored in the IPM 520 before the header is sent to the forwarding engine. The original packet header may comprise a plurality of individual headers, including conventional layer 2 and layer 3 headers. The forwarding engine then returns (to the Cobalt ASIC) a modified packet header along with several commands to move the header and its packet trailer into the packet buffer 456. At the appropriate time, the forwarding engine 454 generates commands to move the packet from packet buffer 456 to an appropriate line card 416.

Figure 6A:
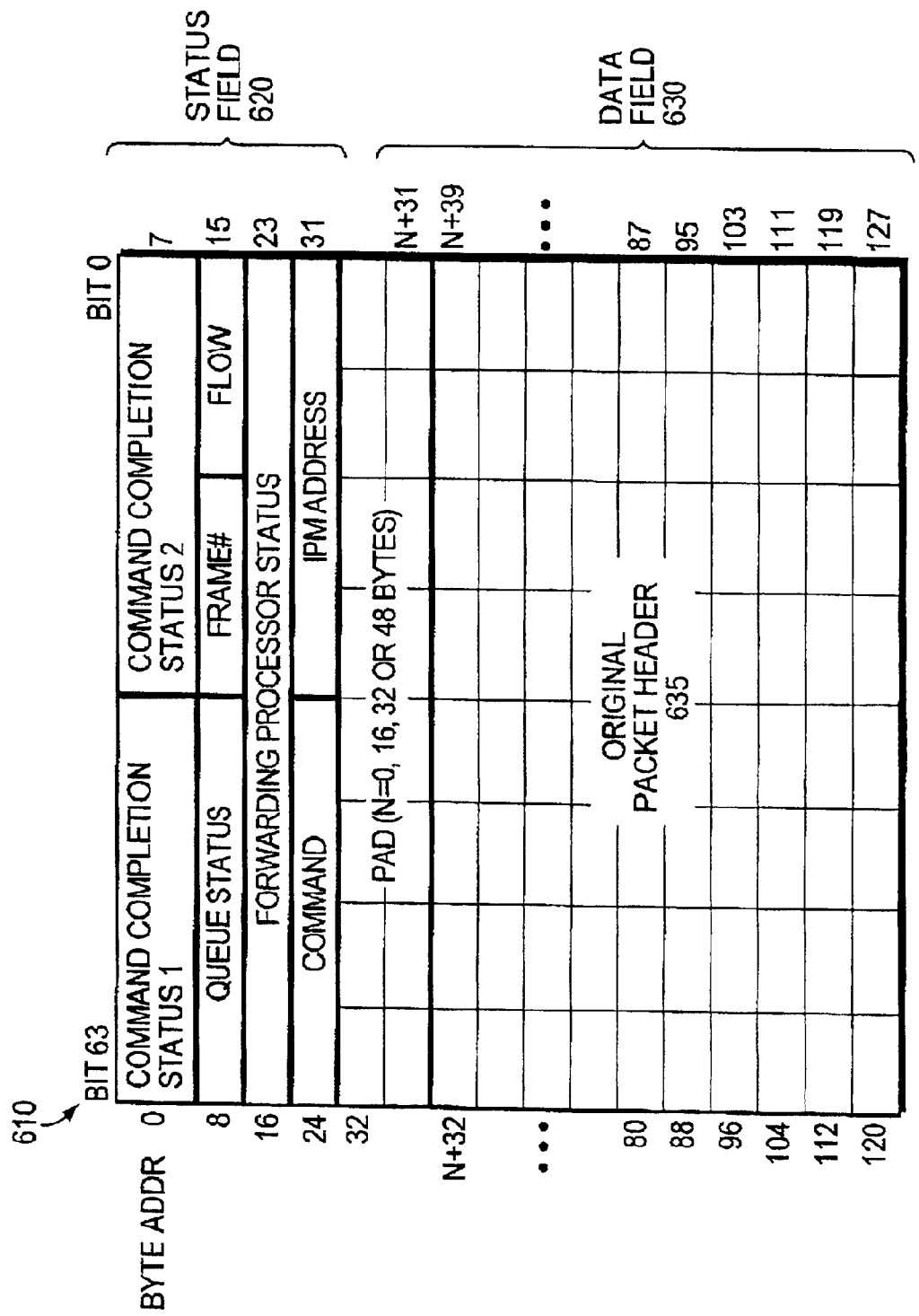
FIG. 6A is a schematic block diagram of a new work context that may be advantageously used with the present invention.

For each packet received from a line card 412 over the interconnect system 440, the Cobalt ASIC generates a context (e.g., a new work context) that notifies the forwarding engine 454 that a complete new packet 458 is available from the IPM 520. The original header of the packet is then copied into the new work context. FIG. 6A is a schematic block diagram of the new work context 610 that, illustratively, is 128 bytes in length. A 32-byte status field 620 contains status (state) information, such as output command completion status, queue status and forwarding processing status. The remainder of the context, i.e., a data field 630, accommodates an original packet header 635 that is processed (modified) by the forwarding engine 454.

Assume a packet arrives at the router over a T1 port and is transmitted from the router over an Ethernet port The Cobalt ASIC copies the original header 635 of the packet into a new work context 610 and passes the context to the forwarding engine, where it is stored in a packet header buffer, i.e., a context memory 455. In the illustrative embodiment, there is a context memory 455 associated with each processor of the forwarding engine 454 and each context memory is configured to store a worst-case packet header length. The forwarding engine 454 logically removes the T1 header, renders a forwarding decision based on the destination address of the IP header that, e.g., indicates transmission of the packet over an Ethernet interface and, accordingly, adds an Ethernet header to the packet header stored in the context. Here, the modified packet header actually increases in size from the original header. For example, assume the original L2 header is 8 bytes in length of which 4 bytes comprises T1 (e.g., HDLC) header and 4 bytes comprises an interconnect header. In contrast, the new modified L2 header is 18 bytes in length of which 14 bytes comprises Ethernet header and 4 bytes comprises interconnect header.

Increasing ("growing") the modified header is easily achieved within a context as long as there is "space" available in the context memory, i.e., in the context between the status field 620 and the data field 630. However, as the forwarding engine processes the context, it modifies the contents of that context (e.g., the packet header) and also writes (stores) commands into the status field 620, thereby reducing the available context space for the modified packet header. These commands are used to instruct the Cobalt ASIC (DMA engines 530) as to actions that need to be taken for the context as a result of processing by the forwarding engine. An example of such a command is a move command used to instruct to the Cobalt ASIC with respect to moving data in and among the (internal and external) memory of the router.

Figure 6B:
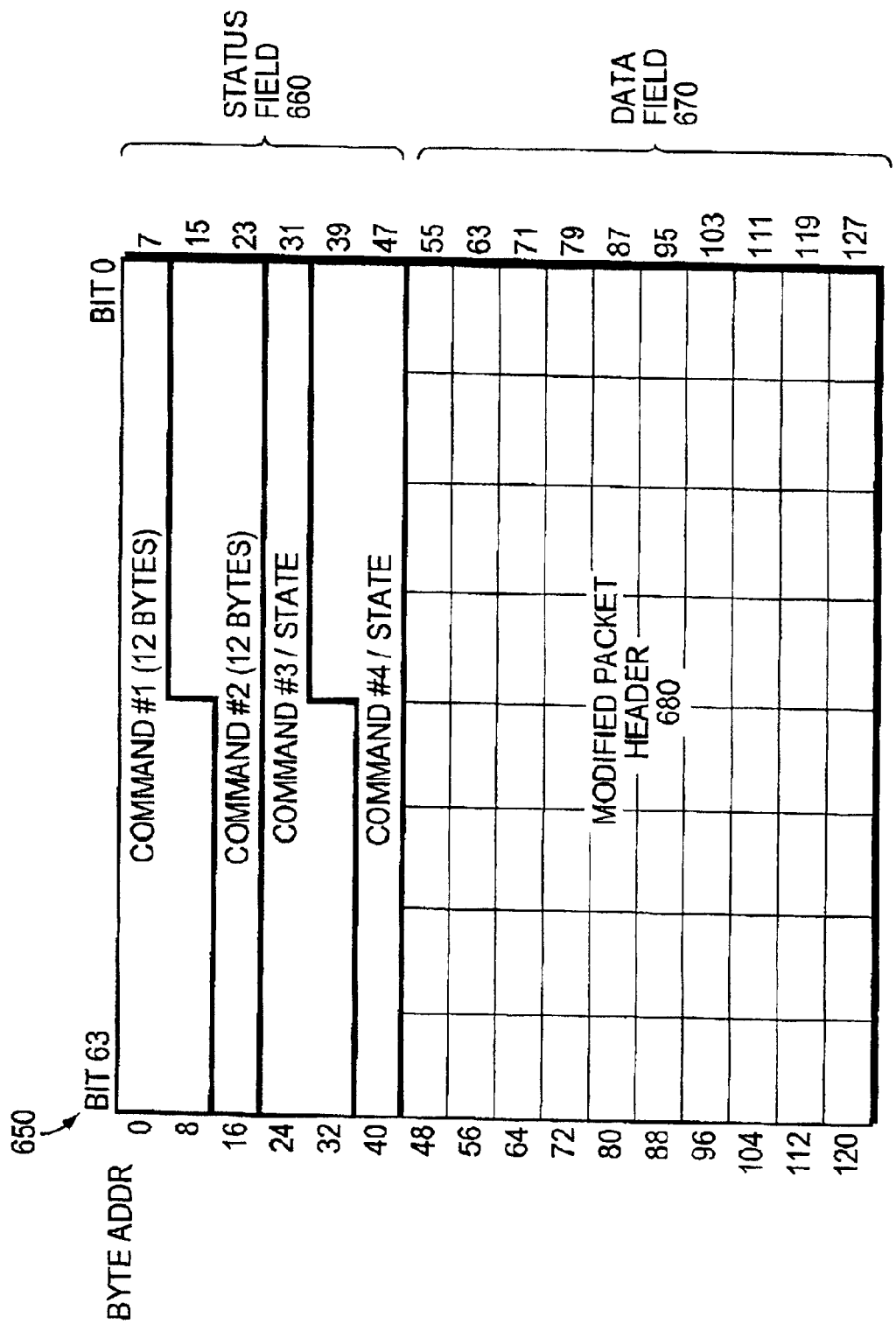
FIG. 6B is schematic block diagram of a processed context that may be advantageously used with the present invention.

FIG. 6B is schematic block diagram of a processed (modified) context 650 delivered by the forwarding engine 454 to the DMA engines of the Cobalt ASIC. A status field 660 of the context contains, e.g., 4 commands that are preferably executed in order, starting with command #1, by the DMA engines. The 4 commands consume 48 bytes, leaving space for only 80 bytes of modified packet header 680 in a data field 670. In the illustrative embodiment, each command is 12 bytes in length so that up to 10 commands, i.e., 120 bytes, can reside within the processed context 640. As noted, state information may also be stored within the status field 660 of processed context. Therefore, the space consumed by state information and commands may exceed the 32-byte status field 620 originally designated for the new work context 610. An object of the present invention is to limit the amount of costly on-chip context memory of the forwarding engine. Yet, for certain types of packets that arrive at the router on interfaces requiring small headers and that leave the router from interfaces requiring larger headers, it is possible that the forwarding engine may "run out" of space when storing the processed context (i.e., modified header) in the context memory. The present invention is directed to a method and apparatus that addresses this problem.

Figure 6C:
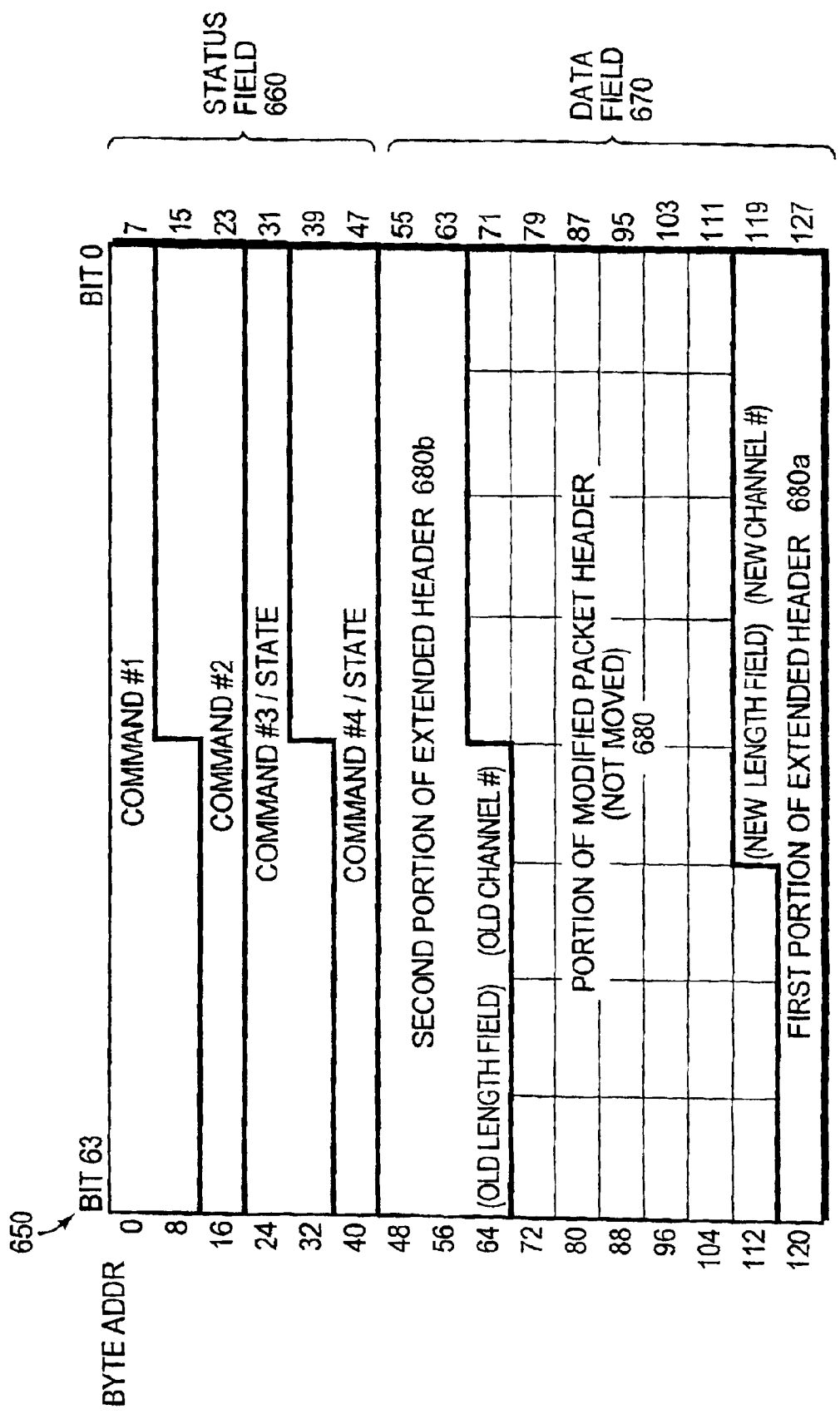
FIG. 6C is a schematic block diagram of an extended packet header "wrapping around" the end of a processed context of FIG. 6B.

Specifically, the state information and commands may consume as much as 64 bytes of the 128-byte processed context; accordingly, there are situations where the new modified packet header may not be able to grow beyond 64 bytes of the context. Consequently, portions of the new extended header may need to "overvrite" portions of the unmodified original packet header stored in the data field of the context to ensure that the extended packet header can be stored in the context memory. FIG. 6C is a schematic block diagram illustrating the format of a modified, extended packet header 680 "wrapping around" the end of a processed context 650. As noted, the forwarding engine typically receives an original packet header 635 in a new work context 610, modifies or extends that header, and "builds" commands (and state information) for the Cobalt ASIC, thus creating a processed context 650. In general, the commands and state information compete with the extended packet header 680 for the space in the context starting at, e.g., byte 0 of the context and proceeding to the beginning of the original packet header 635 in the new work context 610.

To prevent the forwarding engine from shifting the packet data or issuing additional move commands to "play out" non-contiguous portions of the processed context, the invention enables the forwarding engine to specify a "wrap-around" point within the processed context when move commands are processed. If the extended header is too long to fit in the space between the commands/state and the unmodified portion of the original packet header, the tail end of the original packet header, e.g., can be overwritten. The overwritten packet header data is then re-fetched from the IPM, assuming nondestructive packet header retrievals of the IPM.

For example, assume an entire packet, including its original header, is received at the Cobalt ASIC and stored in the IPM 520. Assume further that 64 bytes of the original packet header 635 are loaded into a new work context 610. Thus the remainder (trailer) of the entire packet, along with a copy of those 64 bytes of packet header, is stored in the IPM. The portion of the original packet header that is overwritten (e.g., the lower portion of the processed context) but that is not modified by the extended modified header may be re-fetched from the entire packet stored in the IPM. Re-fetching of the overwritten portion of the original header may occur when moving the packet into, e.g., the packet buffer 456.

In the illustrative embodiment, the move command loaded into the processed context instructs DMA engines 530 within the Cobalt ASIC to move (i) the extended modified packet header 680 from the processed context 650 and (ii) the remaining packet trailer from the IPM 520 into an external bulk memory, e.g., the packet buffer 456 where they are merged. Notably, the address of the packet trailer is specified within the move command. Yet, if a portion of the original packet header within the context is overwritten within, e.g., the lower portion of the processed context, then the address specified in the IPM must be adjusted to re-fetch the overwritten portion from the IPM 520.

One way to achieve this result is to specify discrete DMA operations that eventually merge the header and trailer of the packet in the packet memory. For example, a first DMA command may specify moving a first portion of the extended header 680a from the context 650 into a first area of the packet buffer 456, while another DMA command may specify moving a second portion of the extended packet header 680b to a second area of that buffer. A third DMA command may then specify moving the remaining portion of the modified packet header 680 to a third area of the packet buffer 456, while a fourth DMA command may specify moving the packet trailer from the IPM to a fourth area of the buffer 456. Thus, four DMA commands are needed to move the merged packet into, e.g., a contiguous area of packet buffer. However, these commands consume space within the processed context 650 and, as noted, such space is a critical resource of the aggregation router 400. The present invention is further directed, in part, to carefully managing that resource.

According to the present invention, a method and apparatus is provided for managing the processed context 650 stored in context memory 455 of the forwarding engine 454. The invention preferably comprises a wrap control function capability within the move command that is generated by the forwarding engine 454 and that is included within the processed context 650. The wrap control function works in conjunction with the DMA engines 530 to detect the end of the processed context and to wrap to a predetermined offset within the processed context 650 where the modified portion of the extended packet header resides. In other words, the overwritten portion of the extended packet header resides at the predetermined offset defined by the wrap control function. Rather than wrapping to the beginning of a context, the wrap control capability specifies a predetermined offset (boundary) within the processed context at which the wrap point occurs. In the illustrative embodiment, the wrap around point is defined as predetermined 16-byte boundaries that enables the processed context to accommodate a predetermined number of commands and state information within its status field 660. The DMA engines utilize the wrap control function when retrieving the extended packet header from the processed context.

Figure 7:
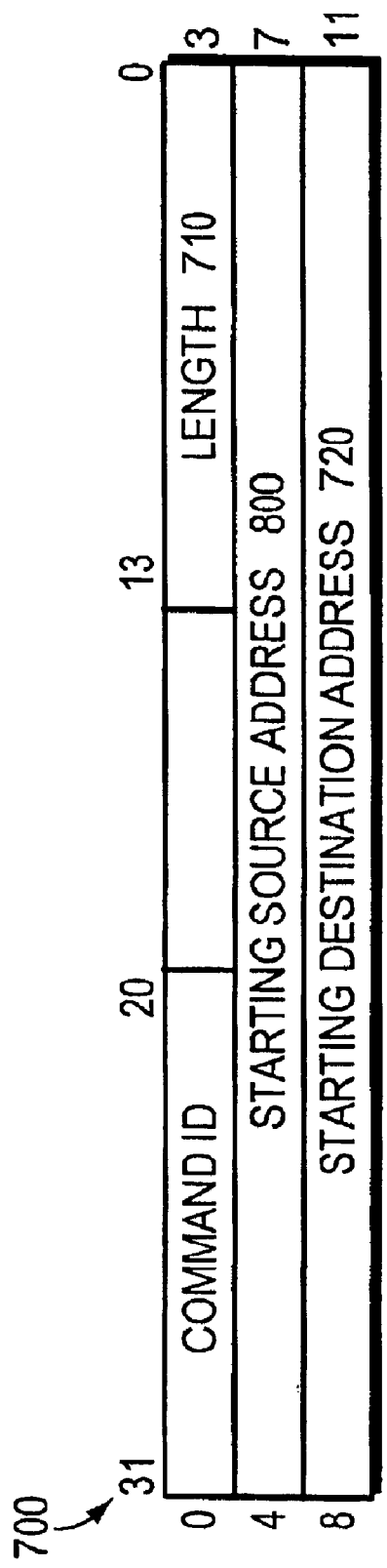
FIG. 7 is a schematic block diagram illustrating the format of a move command having a starting source address field that may advantageously used with the present invention.

FIG. 7 is a schematic block diagram illustrating the format of the move command 700. The move command includes, inter alia, a length field 710 indicating the total length (bytes) of data to be moved, a starting source address field

800 and a starting destination address field 720. The contents of the latter fields specify the starting points for moving data among, e.g., various memories (the packet buffer 456 and IPM 520) and contexts, such as the processed context 650. The move command is preferably a blocking command and thus prevents subsequent commands from being processed until completed. The time needed to process a move command is dependent on the source and destination, the length of the transfer and the boundary alignments.

Figure 8:
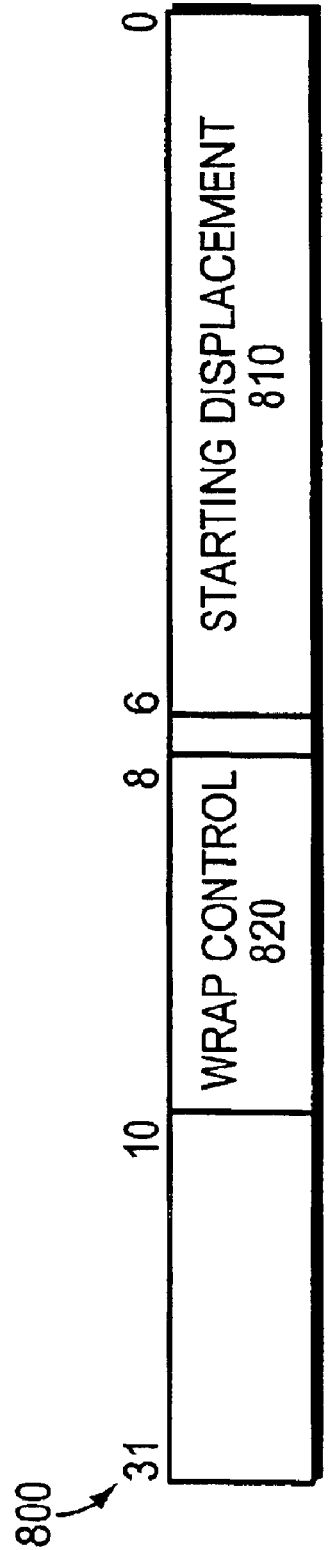
FIG. 8 is a schematic block diagram illustrating the format of the starting source address field including a novel wrap control function in accordance with the present invention.

According to the invention, the forwarding engine indicates the wrap-around point as part of the source address of a move command that further specifies the processed context as the source of the move operation. FIG. 8 is a schematic block diagram illustrating the format of the starting source address field 800. A starting displacement field 810 indicates the byte address within the processed context at which the move data transfer begins. A wrap control field 820 contains a wrap control function indicating which 16-byte boundary within the processed context is assigned the wrap around point. In other words, the wrap around point is the byte address of the processed context 650 at which to wraparound the end of the context, e.g., 000=address displacement 0, 001=address displacement 16 and 002=address displacement 32.

Referring again to FIGS. 6A and 6C, assume a new work context 610 is 128 bytes long and an original packet header 635 is received in bytes 64–127 of the context. Assume also that the new extended header 680 is longer than the original packet header and that the command/state information consumes 48 bytes of the processed context 650. The processors of the forwarding engine overwrite the original (old) length and channel number fields, along with 16 bytes before the original packet header, while also overwriting 13 bytes at the end of the original context. Accordingly, the new extended packet header is 80 bytes long in "contiguous" context space starting at displacement 115 of the processed context.

Specifically, the first 32 bytes of the context 610 are used to pass information about the ingress interface and the status of various queues of the router. Also, the maximum expected packet header size is 64 bytes and, accordingly, the original header is loaded into bytes 64–127 of the context. A processor of the forwarding engine, upon receiving the new work context, determines that a small layer 2 header is present (e.g., a 4-byte PPP). Therefore, the IP header starts at byte 68. However, after examining the destination address of the IP header, the processor determines that this packet is targeted for a tunnel over an Ethernet link. The processor thus adds a tunnel header plus the Ethernet layer 2 header. In addition, the processor adds state information in the context to be passed to the next processor in the pipeline (within bytes 32–47 of the context) and outputs move commands to instruct the DMA engines with respect to moving packets to and from external packet buffer. The length of the tunnel header and the new layer 2 header exceeds the space available between byte addresses 48 and 68. Yet, shifting the packet in the context is too expensive from a processor cycle count.

Notably, the processor takes advantage of the fact that, in the case of the small L2 header, a latter portion of the original packet header 635 is not required and thus is not modified. That is, the latter portion of the header was passed in the context 610 in case the layer 2 or tunnel headers to be removed were long. Therefore, when the processor writes (modifies) a new header, it can overlay the new extended header 680 onto the portion of the packet header 635 that is not modified. For example, to add a 33-byte header, the processor can write the header starting at locations 115–127 and then wrap to locations 48–67, where it is contiguous with the rest of the packet header. The processor can compute these addresses "manually" or the context can be mapped to a larger decode within the processor address space. As for the latter mapping option, additional logic is provided to "know" that write operations beyond the 128 th byte of the context space automatically wrap around to a configured address (e.g., byte 48 in the context). Therefore, the processor sees the space as contiguous.

When issuing move commands to the external DMA engines, the processor specifies the starting location within the context of the new extended packet header, e.g., byte 115, and the length of the move operation, e.g., 80 bytes. It also specifies in the command that the DMA logic should wrap from byte 127 to byte 48 when it reaches the end of the context. Therefore, the packet header is logically contiguous and only one move command 700 need be issued. Although multiple move commands could have been issued (e.g., move 13 bytes starting at byte 115 and move 57 bytes starting at byte 48), this would require more processor cycles to compute and generate commands, and the extra commands would compete even further for the limited context space. When the move command 700 is processed, the specified packet header is merged with the packet trailer temporarily stored in the IPM 520 prior to writing the new packet into external packet buffer 456.

In essence, the invention comprises a wrap control function capability within the move command that is generated by micro-code executing on the forwarding engine and that is included within a processed context. The wrap control function works in conjunction with the ability of the Cobalt ASIC to detect the end of the processed context and wrap to a specified offset within that context. That is, rather than wrapping to the beginning of a context (as is typical) the wrap control capability specifies a predetermined offset (boundary) within the processed context at which the wrap point occurs. As noted, the DMA engines within the Cobalt ASIC preferably process these move commands in order.

Advantageously, the inventive wrap around technique addresses a plurality of problems solved by the invention. First, because of the limited space within the processed context (and context memory resource), there is a need to minimize the number of commands stored in the context for use by DMA logic of the Cobalt ASIC. Second, by reducing the number of commands stored in the processed context, the invention also solves the problem of limiting the processing overhead need to generate those commands. The invention further solves the problem of requiring the network processor to move header information within the context to make room for new header information. Moving data within the context is a processor-intensive task that lowers performance of the router. Finally, by limiting the number of commands stored in the processed context, the overhead consumed by the DMA logic when processing those commands is reduced. In the absence of the present invention, there may be circumstances wherein a processed context cannot accommodate all of the added commands that instruct the DMA engine logic to, e.g., move the modified extended packet header information contained in that context. This would clearly impact the performance of the forwarding engine and, of course, the aggregation router.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for managing a packet header buffer associated with at least one processor of a forwarding engine contained within an intermediate node of a computer network, the method comprising the steps of:

storing a context in the packet header buffer, the context comprising an original packet header of a complete packet received at the node;

processing the context to generate a processed context having an extended packet header that is longer than the original packet header;

overwriting an unmodified portion of the original packet header with a modified portion of the extended packet header to ensure that the extended packet header can be stored in the packet header buffer, the overwritten portion of the extended packet header residing at a predetermined offset within the processed context;

specifying the predetermined offset using a wrap control function of the processed context; and detecting the end of the processed context and wrapping to the predetermined offset within the processed context using the wrap control function when retrieving the extended packet header from the processed context.

2. The method of claim 1 wherein the forwarding engine is embodied as at least one chip and wherein the packet header buffer is a context memory contained on the chip.

3. The method of claim 2 wherein the at least one chip is an application specific integrated circuit.

4. The method of claim 1 wherein the forwarding engine is embodied as a chip having a plurality of processors arrayed as pipelines and wherein the packet header buffer is a context memory associated with each processor, the context memory contained on the forwarding engine chip.

5. The method of claim 4 wherein the step of processing comprises the steps of:

adding and removing headers from the original packet header; and preserving a portion of the processed context for passing state information to and between processors of a pipeline and for passing at least one command to logic external to the forwarding engine chip.

6. The method of claim 5 wherein the external logic is a direct memory access (DMA) engine and wherein the at least one command is a move command including the wrap control function.

7. The method of claim 6 further comprising the steps of:

holding a trailer of the complete packet in an off-chip memory;

delivering the extended packet header and the move command in the processed context to the DMA engine;

instructing the DMA engine, by way of the move command and wrap control function, to move the extended packet header and trailer into an external bulk memory; and merging the extended packet header with the trailer at the external bulk memory.

8. Apparatus for managing a context memory of a forwarding engine contained within a router of a computer network, the apparatus comprising:

a new work context adapted for storage in the context memory, the new work context comprising an original packet header of a complete packet received at the router;

a plurality of processors arrayed as at least one pipeline of the forwarding engine, the processors adding and removing headers from the original packet header of the new work context;

a processed context generated by the processors and having an extended packet header that is longer than the original packet header, the processors overwriting an unmodified portion of the original packet header with a modified portion of the extended packet header to ensure that the extended packet header can be stored in the context memory, the overwritten portion of the extended packet header residing at a predetermined offset within the processed context, a portion of the processed context preserved for passing state information to and between the processors of the pipeline and for passing at least one command external to the forwarding engine;

a wrap control function of the processed context configured to indicate the predetermined offset; and direct memory access (DMA) logic adapted to detect the end of the processed context and wrap to the predetermined offset within the processed context using the wrap control function when retrieving the extended packet header from the processed context.

9. The method of claim 8 wherein the router is an aggregation router.

10. The apparatus of claim 8 wherein the forwarding engine is embodied as at least one chip.

11. The apparatus of claim 10 further comprising:

an off-chip memory adapted to hold a trailer of the complete packet; and an external bulk memory of the router.

12. The apparatus of claim 11 wherein the at least one command is a move command including the wrap control function, the move command and wrap control function instructing the DMA logic to move the extended packet header and trailer into the external bulk memory, where they are merged.

13. The apparatus of claim 12 wherein the off-chip memory is an internal packet memory and wherein the external bulk memory is a packet buffer.

14. A computer readable medium containing executable program instructions for managing a packet header buffer associated with processors of a forwarding engine contained within an intermediate network node, the processors arrayed as a pipeline, the executable program instructions comprising program instructions for:

storing a context in the packet header buffer, the context comprising an original packet header of a complete packet received at the node;

processing the context to generate a processed context having an extended packet header that is longer than the original packet header;

overwriting an unmodified portion of the original packet header with a modified portion of the extended packet header to ensure that the extended packet header can be stored in the packet header buffer, the overwritten portion of the extended packet header residing at a predetermined offset within the processed context;

specifying the predetermined offset using a wrap control function of the processed context; and detecting the end of the processed context and wrapping to the predetermined offset within the processed context using the wrap control function when retrieving the extended packet header from the processed context.

15. The computer readable medium of claim 14 wherein the program instruction for processing comprises program instructions for:

adding and removing headers from the original packet header; and preserving a portion of the processed context for passing state information to and between the processors of the pipeline and for passing at least one command to logic external to the forwarding engine.

16. The computer readable medium of claim 15 wherein the external logic is a direct memory access (DMA) engine and wherein the at least one command is a move command including the wrap control function.

17. The computer readable medium of claim 16 further comprising program instructions for:

holding a trailer of the complete packet in an off-chip memory;

delivering the extended packet header and the move command in the processed context to the DMA engine;

instructing the DMA engine, by way of the move command and wrap control function, to move the extended packet header and trailer into an external bulk memory; and merging the extended packet header with the trailer at the external bulk memory.

18. Apparatus for managing a packet header buffer associated with at least one processor of a forwarding engine contained within an intermediate node of a computer network, the apparatus comprising:

means for storing a context in the packet header buffer, the context comprising an original packet header of a complete packet received at the node;

means for processing the context to generate a processed context having an extended packet header that is longer than the original packet header;

means for overwriting an unmodified portion of the original packet header with a modified portion of the extended packet header to ensure that the extended packet header can be stored in the packet header buffer, the overwritten portion of the extended packet header residing at a predetermined offset within the processed context;

means for indicating the predetermined offset within the processed context;

means for detecting the end of the processed context and wrapping to the predetermined offset within the processed context when retrieving the extended packet header from the processed context.

19. The apparatus of claim 18 wherein the forwarding engine is embodied as a chip having a plurality of processors arrayed as pipelines and wherein the packet header buffer is a context memory associated with each processor, the context memory contained on the forwarding engine.

20. The apparatus of claim 19 wherein the means for indicating is a wrap control function of the processed context.

21. The apparatus of claim 20 wherein the means for processing comprises:

means for adding and removing headers from the original packet header; and means for preserving a portion of the processed context for passing state information to and between processors of a pipeline and for passing at least one command to logic external to the forwarding engine chip.

22. The apparatus of claim 21 wherein the external logic is a direct memory access (DMA) engine and wherein the at least one command is a move command including the wrap control function.

23. The method of claim 22 further comprising:

means for holding a trailer of the complete packet in an off-chip memory;

means for delivering the extended packet header and the move command in the processed context to the DMA engine;

means for instructing the DMA engine to move the extended packet header and trailer into an external bulk memory; and means for merging the extended packet header with the trailer at the external bulk memory.

* * * * *